June 5, 1956 A. SHADOWITZ 2,749,518

FREQUENCY MODULATED OSCILLATOR SYSTEM

Filed June 27, 1951

INVENTOR
ALBERT M. SHADOWITZ
BY Percy P. Lantzy
ATTORNEY 2,749,518

FREQUENCY MODULATED OSCILLATOR SYSTEM

Albert Shadowitz, Nutley, N. J., assignor to International Telephone and Telegraph Corporation, a corporation of Maryland Application June 27, 1951, Serial No. 233,721

11 Claims. (Cl. 332—28)

This invention relates to systems for producing frequency modulated waves and particularly to those of the reactance tube type.

Various frequency modulated systems have been described in which a reactance tube is employed to modulate the frequency of an oscillator. Such systems have included at least two tubes, an oscillator tube and a reactance tube, and often more than two tubes, particularly where a wide range of frequency deviation is desired. The reactance tube circuit in such systems includes a phase shifting network so that the output current of the reactance tube may be in quadrature with the output voltage of the oscillator.

An object of the present invention is to provide a frequency modulated oscillator system of the general type hereinabove referred to but of greater simplicity in that the reactance modulator tube is eliminated.

Another object of the present invention is to provide a frequency modulated oscillator system of the general type hereinabove referred to but of greater simplicity in that the phase shifting network is eliminated.

A further object of the present invention is to provide a relatively simple frequency modulated oscillator system of the type hereinabove referred to which is capable of relatively wide frequency deviation.

In accordance with features of the present invention the oscillator and the reactance tube are replaced by a single tube, such as a pentode, and the phase shifting circuit of the reactance tube is eliminated, the phase shaft within a substantially series resonant frequency determining circuit of the oscillator being used instead.

The above-mentioned and other features and objects of this invention and the manner of attaining them will become more apparent by reference to the following description taken in conjunction with the accompanying drawings, wherein.

Figure 1:
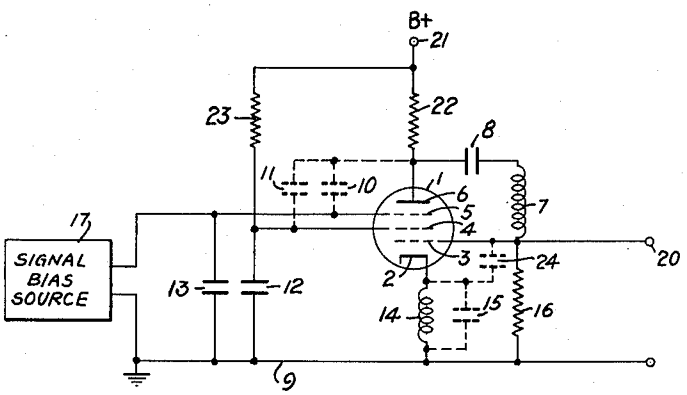
Fig. 1 is a schematic diagram of a frequency modulator-oscillator system embodying my invention.
Figure 3:
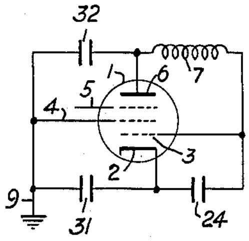
Fig. 3 is a schematic diagram of the equivalent radio frequency oscillator circuit.

Referring to the embodiment illustrated in Fig. 1, the single tube may consist of a pentode 1 having a cathode 2, control grid 3, screen grid 4, suppressor grid 5 and anode 6. The oscillator may take any suitable form. One form which may be used consists essentially of a Colpitts oscillator in which an L–C series circuit replaces the inductor. The frequency-determining circuit of the oscillator of the arrangement of Fig. 1 is shown in Fig. 3 and comprises an inductance 7, connected at one end to the control grid 3 and at its other end through a direct-current blocking condenser 8, which may be considered a short circuit for the radio frequency oscillatory energy, to the plate 6; an equivalent capacitance 32, which consists physically of the output capacitance between the anode 6 and ground 9, comprising the inter-electrode capacitance 10, between the anode 6 and the suppressor grid 5 in series with the radio frequency by-pass capacitor 13 between the suppressor grid 5 and ground 9 as well as the inter-electrode capacitance 11, between the anode 6 and the screen grid 4 in series with the radio frequency by-pass capacitory 12 between the screen grid 4 and ground 9 as well as all the other stray capacitances between the anode 6 and ground 9; a capacitance 24 constituting the inter-electrode capacitance between the control grid 3 and cathode 2; and an equivalent capacitance 31 comprising the combined reactance at the oscillator frequency of the inductor 14 between cathode 2 and ground 9 and the stray capacitance 15 between cathode 2 and ground 9. It should be noted that the combined reactance is capacitive when the parallel resonant circuit between the cathode 2 and ground 9 is tuned to a frequency substantially lower than the operating frequency. In functioning as an oscillator the screen grid 4 is the equivalent of the usual oscillator anode and the other two electrodes, that is, the control grid 3 and the cathode 2 function in the normal manner. The oscillator may include the usual grid return having a grid leak resistor 16 between control grid 3 and ground 9.

To vary and control the frequency of this oscillator, voltages from a signal and bias voltage source 17 are applied between the suppressor grid 5 and ground. These voltages vary the anode current. It will be seen that the anode current is 180° out of phase with the voltage on control grid 3. But the anode voltage will have a large component 90° out of phase with the control grid voltage since the anode is connected to the junction between the inductance 7 and the capacitance 32 while the control grid is connected to the other end of the inductance. Thus the frequency-determining resonant circuit is in effect also employed as a phase shifter and the anode circuit acts as a variable reactance across the anode to ground fixed capacitance since the anode voltage will have a large component 90° out of phase with the anode current. The anode circuit thereby fulfills the function of a reactance tube, delivering a variable amount of quadrature current. It will therefore be seen that the frequency of the output, which may be taken off the control grid 3 as indicated by terminal 20 in Fig. 1, will be varied in accordance with variations in the voltage from the signal and bias source 17.

The bias of the source 17 may be employed to maintain the correct center frequency and may be derived from a suitable frequency discriminating network according to conventional practice.

In the embodiment of Fig. 1, the anode 6 is connected to a source of anode potential 21 via an anode resistor 22, the screen grid 4 likewise being connected to said source 21 through a suitable resistor 23. In the embodiment illustrated in Fig. 2 the anode resistor 22 is eliminated. This is done by inserting the tuning coil 7 in its place and inserting a tuning condenser 29 between the anode and control grid. To ensure that the end of coil 7 which is connected to the anode voltage supply 21 should be at radio frequency ground potential it is connected via a by-pass condenser 25 to ground. The coil 7 now has the plate to ground capacitance 32 of Fig. 3 directly across it to form a parallel tuned circuit. If the resonant frequency of this tuned circuit is substantially above the operating radio frequency of the oscillator the net effect of the tuned circuit at the oscillator frequency will be that of an equivalent inductance. The equivalent circuit of Fig. 3 will be applicable to this case also, then, if capacitance 26 is replaced by this equivalent inductance and inductance 7 is replaced by capacitance 29.

Figure 2:
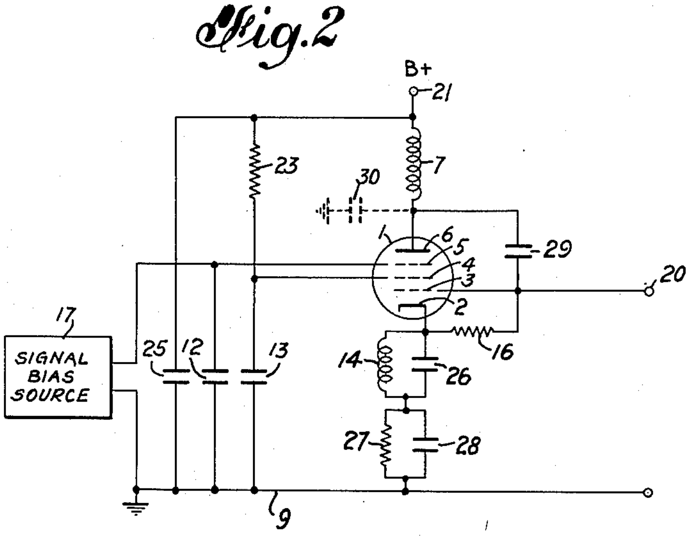
Fig. 2 is a schematic diagram of a modified form of a frequency modulator-oscillator system likewise in accordance with my invention.

The essential difference between the equivalent circuits for the embodiment of Fig. 1 and Fig. 2 is that in the former the anode to ground voltage is obtained across a capacitance while in the latter it is obtained across an inductance. Variations of the suppressor voltage in the embodiment of Fig. 1 thereby introduce a variable capacitance into the frequency determining network of the embodiment of Fig. 1 while they introduce a variable inductance into the frequency determining network of the embodiment of Fig. 2.

As stated hereinbefore the inductance 14 in series with the cathode functions in the oscillator as a capacitance. To ensure this, an additional capacitance 26 may be arranged in parallel thereacross. Also to provide for automatic bias of the suppressor grid to the point of minimum modulation distortion, a cathode bias resistor 27 shunted by the usual by-pass condenser 28, may be connected in series between cathode and ground. In order to prevent this bias resistor from affecting the oscillator action the grid leak resistor 16 may then be connected directly from the control grid 3 to the cathode.

In order to make the circuits of Figs. 1 and 2 sensitive to variations in the signal bias source 17 the tube 1 should have characteristics such that the suppressor grid has an appreciable transconductance. Such a tube, e. g., is the type 6AS6.

While I have described above the principles of my invention in connection with specific apparatus, it is to be clearly understood that this description is made by way of example only and not as a limitation of the scope of my invention, as set forth in the objects thereof and in the accompanying claims.

I claim:

1. A system for producing frequency modulated waves comprising an electron discharge device having a cathode, anode and a plurality of grids, circuit means coupling two of said grids, said anode and said cathode to produce oscillations, said circuit means including a series circuit resonant at the mean operating frequency of said system and having inductance and capacitance in series, said anode being coupled to the junction of said inductance and capacitance, and means for applying a control voltage to one of said grids to control the frequency of the cyclic operation of said device.

2. A system according to claim 1, wherein said series circuit is coupled between two of said plurality of grids.

3. A system according to claim 1, wherein said series circuit is coupled between a first and second of said plurality of grids, said second grid is coupled to ground, and an inductor is coupled in series between the cathode and ground.

4. A system according to claim 1, wherein said inductance is coupled between a first grid of said plurality of grids and said anode, and said capacitance includes the capacity between said anode and ground.

5. A system according to claim 1, further including a source of anode voltage and wherein the inductance of said series circuit is coupled in series between the anode and said source of anode voltage, and said capacitance includes a condenser coupled between the anode and a first grid of said plurality of grids.

6. A system according to claim 1, wherein said series circuit is coupled between a first and second of said plurality of grids, with the inductance thereof coupled between said first grid and said anode and the capacitance thereof coupled between said anode and ground, means coupling said second grid to ground and an inductor coupled in series between said cathode and ground.

7. A system according to claim 1, wherein said series circuit is coupled between a first and second of said plurality of grids, with the inductance of said series circuit coupled in series between the anode and a source of anode voltage and said capacitance includes a condenser coupled between the anode and said first grid, means coupling said second grid to ground and an inductor coupled between the cathode and ground.

8. A system for proucing frequency modulated waves comprising an electron discharge device having a cathode, anode and first, second and third grids, a series circuit resonant at the mean operating frequency of said system and having inductance and capacitance in series, means coupling said anode to the junction of said inductance and capacitance, one end of said series circuit being coupled to said first grid and a second end of said series circuit being coupled to ground, means for coupling said cathode to ground, means for coupling another of said grids to ground, and means for applying control voltages to the other of said grids to control the frequency of the cyclic operation of said device.

9. A system according to claim 8, wherein the capacitance of said series circuit includes the interelectrode capacity between said anode and said second and third grids.

10. A system according to claim 8, wherein said series circuit includes a capacitance connected to said first grid and an inductance coupled between the anode and ground, together with stray capacitance in parallel therewith, between said anode and ground.

11. A system according to claim 8, wherein said third grid is a suppressor grid having appreciable tranconductance.

References Cited in the file of this patent

UNITED STATES PATENTS

| | | |
|---|---|---|
| 2,321,354 | Bell et al. | June 8, 1943 |
| 2,350,171 | Lawrence | May 30, 1944 |
| 2,361,731 | Bach | Oct. 31, 1944 |
| 2,378,245 | Rath | June 12, 1945 |
| 2,394,427 | Clark et al. | Feb. 5, 1946 |
| 2,521,694 | Crosby | Sept. 12, 1950 |
| 2,563,964 | Schlang | Aug. 14, 1951 |
| 2,682,639 | Haner | June 29, 1954 |

FOREIGN PATENTS

| | | |
|---|---|---|
| 596,722 | Great Britain | Jan. 9, 1948 |